United States Patent [19]

Nakamura et al.

[11] Patent Number: 5,973,067
[45] Date of Patent: Oct. 26, 1999

[54] PRIMER COMPOSITION AND ADHESION METHOD

[75] Inventors: Akito Nakamura; Katsuyoshi Nakasuji; Yoshito Ushio, all of Ichihara, Japan

[73] Assignee: Dow Corning Toray Silicone Co., Ltd., Tokyo, Japan

[21] Appl. No.: 08/868,134

[22] Filed: Jun. 3, 1997

Related U.S. Application Data

[63] Continuation-in-part of application No. 08/755,942, Nov. 25, 1996, abandoned.

[30] Foreign Application Priority Data

Nov. 28, 1995 [JP] Japan ................................. 7-334051
Jul. 29, 1996 [JP] Japan ................................. 8-216137

[51] Int. Cl.$^6$ ........................... C08L 83/07; C09D 1/00
[52] U.S. Cl. ................. 524/858; 106/287.15; 528/15; 528/32; 427/387; 427/412.2; 427/409; 427/407.1; 156/307.5; 156/326; 156/329
[58] Field of Search ............... 106/287.15; 524/858; 528/15, 32, 412.2; 427/387, 409, 407.1; 156/307.5, 326, 329

[56] References Cited

U.S. PATENT DOCUMENTS 5,081,181  1/1992  Takahashi et al. ................... 524/766
5,187,014  2/1993  Suzuki et al. ....................... 428/447
5,213,617  5/1993  Blizzard .......................... 106/287.13
5,326,844  7/1994  Fujiki et al. ........................ 528/15
5,364,921  11/1994  Gray et al. .......................... 528/15

FOREIGN PATENT DOCUMENTS 52-32030   3/1977  Japan .
56-103264  8/1981  Japan .
57-21457   2/1982  Japan .
61-4866    2/1986  Japan .
03-12114   2/1991  Japan .
03-54715   8/1991  Japan .

OTHER PUBLICATIONS

Abstract JP 52032030, 1977.

*Primary Examiner*—Margaret G. Moore
*Attorney, Agent, or Firm*—Arne R. Jarnholm; Catherine U. Brown

[57] ABSTRACT

A novel primer composition, which is especially adapted for promoting the adhesion of thermosetting rubbers to substrates having exceptionally inert surfaces, such a nickel, stainless steel and organic resins is disclosed. The composition comprises: (A) 100 parts, by weight, of an organosilicon compound selected from the group consisting of (1) alkenyltrialkoxysilane and (2) mild hydrolyzates of (1); (B) 0.01–200 parts, by weight, of a platinum compound; (C) 0.1–100 parts by weight of an organic titanic acid ester; and optionally (D) a solvent.

12 Claims, No Drawings

PRIMER COMPOSITION AND ADHESION METHOD

This application is a continuation-in-part of application Ser. No. 08/755,942 filed on Nov. 25, 1996, now abandoned.

BACKGROUND OF THE INVENTION

1. Field of the Invention

The present invention relates to a primer composition and a method for the adhesion of a silicone rubber to a substrate. In particular, it relates to a primer composition appropriate for the adhesion of a thermosetting silicone rubber to the surface of a variety of substrates.

2. Description of the Prior Art

Numerous primer compositions for promoting the adhesion of silicone rubber to a variety of substrates are known in the art. For instance, primer compositions having organoalkoxysilane or organoalkoxypolysiloxane resin and organic titanic acid esters as the major agents, and primer compositions containing platinum catalysts have been proposed. (See, for example, Japanese Kokai Patent Application Nos. Sho 56[1981]-103264 and Sho 57[1982]-21457, Japanese Kokoku Patent No. Sho 61[1986]-4866, and Japanese Kokoku Patent Nos. Hei 3[1991]-12114 and Hei 3[1991]-54715).

However, the primer compositions of the prior art are relatively ineffective when used to promote the adhesion of silicone rubber to substrates of stainless steel, nickel, or other metals, polycarbonate, polybutylene terephthalate, and other plastics or other substrates having inert surfaces.

SUMMARY OF THE INVENTION

The present invention overcomes the drawbacks of the prior art in that it provides a primer composition that is effective to promote the adhesion of thermosetting silicone rubbers to the surface of numerous substrates which are generally described as inert. The primer composition of the invention comprises:

(A) 100 parts, by weight, of an organosilicon compound selected from the group consisting of:

(1) alkenyltrialkoxysilane represented by the general formula: $RSi(OR^1)3$, wherein R is an alkenyl group with at least 3 carbon atoms and $R^1$ is an alkyl group or an alkoxylated alkyl group; and (2) mild hydrolyzates of (1);

(B) 0.01–200 parts, by weight, of a platinum compound; and (C) 0.1–100 parts by weight of an organic titanic acid ester.

The use of a solvent (D) in addition to the above-described components (A)–(C) is optional, but preferred if necessary to reduce the viscosity of the primer of the invention so that it can be applied in a thin, uniform layer over the desired substrate.

In the method of the present invention, the above described primer is applied to a substrate surface. After evaporation of the solvent, if any, a thermosetting silicone rubber is applied over the primer-coated surface. Thereafter, the silicone rubber is cured, via heating, and firm adhesion is obtained between the silicone rubber and substrate.

It is therefore an object of the present invention to provide a primer composition for the firm adhesion of a silicone rubber on a variety of contacting substrates.

It is another object of the present invention to provide a method for promoting the adhesion of a thermosetting silicone rubber to the surface of a variety of substrates that are generally referred to as "inert."

DETAILED DESCRIPTION OF THE INVENTION

Component (A) of the primer composition of the invention is an organosilicon compound selected from the group consisting of (1) an alkenyltrialkoxysilane represented by the general formula: $RSi(OR^1)3$, wherein R is an alkenyl group with at least 3 carbon atoms and $R^1$ is an alkyl group or an alkoxylated alkyl group and (2) mild hydrolyzates of (1). R may be an allyl group, a butenyl group, a heptenyl group, a hexenyl group, or other alkenyl group with at least three carbon atoms. Suitable examples of component (A) include allyltrimethoxysilane, allyltriethoxysilane, allyltri (ethoxymethoxy)silane, butenyltrimethoxysilane, hexenyltrimethoxysilane, hexenyltriethoxysilane, and one or more of partially hydrolyzed condensates of these organoalkoxysilanes. Among the aforementioned, allyltrimethoxysilane is preferred.

Component (B) of the composition of the invention, the platinum compound, improves the adhesion between silicone rubber and substrate surface. In particular, it improves the adhesive bond between the silicone rubber and the primer. The platinum compound catalyzes a hydrosilylation reaction between the silicone rubber and primer. Example of component (B) include chloroplatinic acid, alcohol-modified chloroplatinic acid, complexes of platinum and a diketone, platinum-olefin complexes, and complexes formed from chloroplatinic acid and an alkenylsiloxane. Among the aforementioned, the platinum-olefin complexes and the complexes of the chloroplatinic acid and an alkenylsiloxane are preferred because of their high catalytic activities as the hydrosilylation reaction catalysts. In particular, a complex formed from chloroplatinic acid and divinyltetramethyldisiloxane is most preferred.

In the primer composition of the invention, about 0.01–200 parts by weight, with respect to 100 parts by weight of component (A), is used. If an amount less than 0.01 part by weight is used, the adhesive force between the silicone rubber and the primer-coated film will decrease to an unacceptable level. If the amount of component (B) exceeds 200 parts by weight, the increased adhesive force imparted by this component has already reached an upper limit. Hence, the use of additional quantities would be uneconomical.

Component (C) of the primer composition of the invention, an organic titanic ester, causes the primer composition to "set" so that thermosetting silicone rubber can be applied over the primer. Suitable forms of component (C) include organic titanic acid esters, chelate compounds of titanium, chelate compounds of the silicic acid ester of titanium, and mild hydrolyzates thereof. Specific examples of component (C) include tetraisopropyl titanate, tetra-n-butyl titanate, butyl titanate dimer, tetra (2-ethylhexyl) titanate, diethoxytitanium bis (acetyl)acetonate), titanium diacetylacetonate, titanium diacetylacetonate, titanium octylglucoate, titanium lactate, titanium lactate ethyl ester, titanium triethanolaminate, mild hydrolyzates of the aforementioned and combinations thereof. In the primer composition of the invention, the amount of component (C) that is used with respect to 100 parts by weight of component (A) is in the range of 0.1–100 parts by weight and preferably 2–50 parts by weight.

Component (D) of the primer composition of the invention is a solvent that is optionally added to adjust the viscosity of the primer to an appropriate level for a coating operation. There are no special restrictions on the type of solvent so long as it dissolves components (A) through (C). Suitable solvents include toluene, xylene, heptane, hexane, trichloroethylene, ethyl acetate, and other organic solvents, and hexamethylcyclotrisiloxane, octamethylcyclotetrasiloxane, decamethylcyclopentasiloxane, and other silicone solvents. The amount of solvent used in the primer composition is preferably 10–10,000 parts by weight with respect to 100 parts by weight of component (A).

Known additives may be added to the primer composition of the present invention to improve the performance thereof, so long as they do not interfere with adhesion promotion. In particular, additives which are represented by the general formula

$$R^4_d H_e SiO_{(4-d-e)/2}$$

where $R^4$ is a methyl group, an ethyl group, a propyl group, or other alkyl group; a phenyl group or other aryl group, or other monovalent hydrocarbon group; d has an average value of $0 \leq d \leq 3$ and e has an average values of $1 \leq e \leq 3$, with the proviso that $1 \leq d+e \leq 3$.

In addition, other additives known to promote adhesion include organic peroxides such as 2,5-dimethyl-2,5-di(t-butyl peroxy)hexane, di-t-butyl peroxide, benzoyl peroxide, vinyltris(t-butyl)peroxy) silane, trimethyl (t-butyl peroxy) silane, and t-butyl peroxy allyl carbamate may be used.

Still other useful additives include diorganopolysiloxanes represented by the average unit formula of

$$R^5_f SiO_{(4-f)/2}$$

wherein $R^5$ is a methyl group, an ethyl group, a propyl group, or other alkyl group, a vinyl group, an allyl group, a hexenyl group, or other alkenyl group, a phenyl group or other aryl group, or other monovalent hydrocarbon group, with the proviso that at least 0.2 mol % of said $R^5$ groups are alkenyl groups and f is a number between 1.9 and 2.3. Preferably, the aforementioned dioganopolysiloxanes have a viscosity of at least 5,000 cS at 25° C.

Other useful additives include micropowder silica and other inorganic fillers, aliphatic acid salts of cerium, aliphatic acid salts of iron, titanium oxide, carbon black, and other heat-resistance improvers as well as pigments are available.

In using the primer composition of the present invention, it is preferable to coat the substrate and permit the primer to air dry for at least 30 minutes before applying a thermally-curable silicone rubber composition over the same.

Silicone rubbers that may be used with the primer composition of the invention include free radical curing compositions that include a diorganopolysiloxane raw rubber, a filler, and an organic peroxide as the major components. Another type of silicone rubber composition that may be used with the primer composition of the invention is an addition-reaction-setting silicone rubber which includes a vinyl group containing diorganopolysiloxane, organo hydrogen polysiloxane, a filler, and a platinum catalyst as the major components.

The primer composition of the present invention can be used to cause a silicone rubber to firmly adhere to the surface of iron, stainless steel, aluminum, nickel, zinc, copper, and a variety of other metals and their alloys, acryl resin, phenol resin, epoxy resin, polycarbonate resin, polybutylene tereph- thalate resin, alkali-treated fluorine resin films, and other synthetic resin materials, glass, and ceramics.

Heretofore, it has been difficult to cause silicone rubber to adhere to certain substrates which have low surface activities. Such substrates include stainless steel, nickel, polycarbonate and polybutylene terephthalate. The primer composition of the present invention permits the adhesion of silicone rubber to these substrates. Thus, potential applications for the primer composition of the invention and associated method include bonding silicone rubber to the metallic drum of a copying machine and the adhesion of a silicone rubber oil seal to a metallic housing.

APPLICATION EXAMPLES

The present invention is explained below by way of application examples. In the application examples, "parts" and "%" refer to parts by weight and wt %, respectively. The reported viscosities represents the values at 25° C.

Application Example 1

10 parts of allyltrimethoxysilane were added to 100 parts of n-heptane and uniformly mixed. Next, 2 parts of tetra(n-butyl) titanate were added and uniformly mixed. Next, to this solution, a complex of chloroplatinic acid and divinyltetramethyldisiloxane was added at an amount shown in Table I and uniformly mixed. A primer composition as a uniformly dispersed solution was obtained. This composition was coated on each side of an iron plate, a stainless steel plate, a nickel plate, a polycarbonate plate, a polybutylene terephthalate plate, and an alkali-treated fluorine resin (tetrafluoroethylene-perfluoroalkyl vinyl ether copolymer resin) plate. Prior to coating, each of the aforementioned plates had a piece of cellophane tape affixed to one end. The coated plates were allowed to stand at room temperature for 60 min and then air-dried.

100 parts of dimethylvinylsiloxy-terminated dimethylpolysiloxane having a viscosity of 10,000 cS, 15 parts of fumed silica with a specific surface of 200 m2/g, 4 parts of hexamethyldisilazane as the surface-treating agent of silica, and 2 parts of water were uniformly mixed. The composition was heated at 170° C. for 2 h under vacuum. Thereafter, 1.3 parts of a dimethylsiloxane-methyl hydrogen siloxane copolymer (the content of hydrogen atoms bonded to silicon atoms being 0.7 wt %) with both ends of the molecular chain blocked by trimethylsiloxy groups, and 10 ppm platinum metal in the form of chloroplatinic acid, were added and mixed to prepare an addition-reaction-setting silicone rubber composition. This silicone rubber composition was applied to the primer-coated surface of the previously mentioned coated substrates at a thickness of 2 mm. The silicone rubber was then cured under pressure of 25 kg/cm$^2$ and at a temperature of 150° C. for 10 min.

The cellophane tape and the rubber layer were peeled from the substrates, by pulling in a direction normal to the plane of the substrate plate. If the rubber layer did not readily peel, peeling was initiated with a knife. Thereafter, the surface of the metal plate was observed and the amount of rupture occurring in the rubber coating, as compared to areas of bare metal was noted. The portion of rupture in the rubber coating, termed the aggregation destruction ratio, is shown in Table I.

Next, a primer composition was prepared in the same manner as that described previously, except that no platinum compound was added. The characteristics of this primer composition were measured in the same manner as that described previously. These results are also shown in Table I as Comparative Example 1.

TABLE 1

|  | Present Invention | | | | Comparative |
| --- | --- | --- | --- | --- | --- |
|  | 1-1 | 1-2 | 1-3 | 1-4 | Example 1 |
| Primer composition | | | | | |
| Allyltrimethoxysilane (parts) | 10 | 10 | 10 | 10 | 10 |
| Platinum compound (parts) | 0.01 | 0.1 | 1.0 | 10 | 0 |
| Tetra (n-butyl) titanate (parts) | 2 | 2 | 2 | 2 | 2 |
| n-heptane (parts) | 100 | 100 | 100 | 100 | 100 |
| Aggregation Destruction Ratio | | | | | |
| Iron | 100 | 100 | 100 | 90 | 100 |
| Stainless Steel | 100 | 100 | 100 | 90 | 100 |
| Nickel | 60 | 100 | 100 | 80 | 50 |
| Polycarbonate | 50 | 100 | 100 | 70 | 50 |
| Polybutylene terephthalate | 30 | 100 | 100 | 70 | 20 |
| Alkali-treated fluorine resin | 90 | 100 | 100 | 100 | 20 |

Application Example 2

10 parts of hexenyltrimethoxysilane was added to 100 parts of n-heptane and uniformly mixed. 2 parts of tetra(n-butyl) titanate were added and uniformly mixed with the preceding. Next, to this solution, a complex of chloroplatinic acid and divinyltetramethyldisiloxane was added at an amount shown in Table II and uniformly mixed. A primer composition was obtained as a uniformly dispersed solution. This composition was coated on each side of an iron plate, a stainless steel plate, a nickel plate, a polycarbonate plate, and a polybutylene terephthalate plate. Prior to coating, each of the aforementioned plates had a piece of cellophane tape affixed to one end. The coated plates were allowed to stand at room temperature for 60 min and then air-dried.

100 parts of a dimethylvinylsiloxy- terminated dimethylpolysiloxane having a viscosity of 10,000 cS, 15 parts of fumed silica with a specific surface of 200 m²/g, 4 parts of hexamethyldisilazane, and 2 parts of water were uniformly mixed. The composition was then heated under vacuum to 170° C. for 2 h, and a silicone rubber base compound was obtained. To this, 1.3 parts of a trimethylsiloxy-terminated dimethylsiloxane-methyl hydrogen siloxane copolymer (the content of hydrogen atoms bonded with silicon atoms being 0.7 wt %) and 10 ppm of platinum metal in the form of chloroplatinic acid, were added and mixed. An addition-reaction-setting silicone rubber composition was thus obtained. This silicone rubber composition was applied over the surface of the previously-mentioned substrates at a thickness of about 2 mm. The silicone rubber was then cured onto the substrates at a pressure of 25 kg/cm² and a temperature of 150° C. for 10 min.

The rubber was again peeled from the substrate as described in connection with Application Example 1 and the aggregation destruction ratio measured, as reported in Table 2.

Furthermore, a primer composition was prepared in the same manner as that described previously, except that no platinum compound was added. The characteristics of this primer composition were measured in the same manner as that described previously. These results are also shown in Table II as Comparative Example 2.

TABLE II

|  | Present Invention | | | | Comparative |
| --- | --- | --- | --- | --- | --- |
|  | 2-1 | 2-2 | 2-3 | 2-4 | Example 2 |
| Primer Composition | | | | | |
| Hexenyltrimethoxysilane (parts) | 10 | 10 | 10 | 10 | 10 |
| Platinum compound (parts) | 0.01 | 0.1 | 1.0 | 10 | 0 |
| Tetra (n-butyl) titanate (parts) | 2 | 2 | 2 | 2 | 2 |
| n-heptane (parts) | 10 | 100 | 100 | 100 | 100 |
| Aggregation Destruction Ratio | | | | | |
| Iron | 100 | 100 | 100 | 90 | 100 |
| Stainless Steel | 100 | 100 | 100 | 90 | 100 |
| Nickel | 50 | 80 | 90 | 70 | 40 |
| Polycarbonate | 30 | 70 | 80 | 60 | 30 |
| Polybutylene terephthalate | 20 | 80 | 100 | 70 | 10 |

Comparative Example 3

To 100 parts of n-heptane, 10 parts of vinyltrimethoxysilane were added and uniformly mixed. Next, 1 part of tetra(n-butyl) titanate was added and uniformly mixed. Next, to this solution, a complex of chloroplatinic acid and divinyltetramethyldisiloxane was added at an amount shown in Table III and uniformly mixed. A primer composition was obtained as a uniformly dispersed solution. This composition was coated on each side of an iron plate, a stainless steel plate, a nickel plate, a polycarbonate plate, and a polybutylene terephthalate plate. Prior to coating, each of the aforementioned plates had a piece of cellophane tape affixed to one end. The coated plates were allowed to stand at room temperature for 60 min and then air-dried.

An addition-curable silicone rubber was again prepared and coated and cured on the substrate plates as previously described. The rubber was again peeled from the substrate as described in connection with Application Examples 1 and 2 and the aggregation destruction ratio measured. The results are reported in Table III.

TABLE III

|  | Comparative Example 3 | | | | |
| --- | --- | --- | --- | --- | --- |
|  | 3-1 | 3-2 | 3-3 | 3-4 | 3-5 |
| Primer Composition | | | | | |
| Vinyltrimethoxysilane (parts) | 10 | 10 | 10 | 10 | 10 |
| Platinutn compound (parts) | 0.01 | 0.1 | 1.0 | 10 | 0 |
| Tetra (n-butyl) titanate (parts) | 2 | 2 | 2 | 2 | 2 |
| n-heptane (parts) | 100 | 100 | 100 | 100 | 100 |
| Aggregation Destruction Ratio | | | | | |
| Iron | 40 | 80 | 100 | 70 | 20 |
| Stainless Steel | 40 | 100 | 100 | 80 | 20 |
| Nickel | 20 | 60 | 70 | 60 | 10 |
| Polycarbonate | 10 | 60 | 80 | 60 | 10 |
| Polybutylene terephthalate | 10 | 50 | 70 | 50 | 0 |

What is claimed is:

1. A primer composition comprising:
   (A) 100 parts by weight of an organosilicon compound selected from the group consisting of:

(1) an alkenyltrialkoxysilane having a general formula: $RSi(OR^1)_3$, wherein R is an alkenyl group with at least 3 carbon atoms and $R^1$ is selected from the group consisting of alkyl groups and alkoxylated alkyl groups; and (2) mild hydrolyzates of (1);

(B) 0.01–200 parts by weight of a platinum compound; and (C) 0.1–100 parts by weight of an organic titanic acid ester, and (D) 10–10,000 parts by weight of a solvent selected from the group consisting of organic solvents and silicone solvents.

2. The composition of claim 1, wherein the organic solvent is selected from the group consisting of toluene, xylene, heptane, hexane, trichloroethylene, and ethylacetate.

3. The composition of claim 1 wherein said alkenyltrialkoxysilane (1) is selected from the group consisting of allyltrimethoxysilane, allyltriethoxysilane, allyltri(ethoxymethoxy)silane, butenyltrimethoxysilane, hexenyltrimethoxysilane and hexenyltriethoxysilane.

4. The composition of claim 1 wherein said platinum compound (B) is selected from the group consisting of chloroplatinic acid, alcohol-modified chloroplatinic acid, complexes of platinum and a diketone, platinum-olefin complexes, and complexes formed from chloroplatinic acid and an alkenylsiloxane.

5. The composition of claim 1 wherein said organic titanic acid ester (C) is selected from the group consisting of tetraisopropyl titanate, tetra-n-butyl titanate, butyl titanate dimer, tetra (2-ethylhexyl) titanate, diethoxytitanium bis(acetyl)acetonate), titanium diacetylacetonate, titanium diacetylacetonate, titanium octylglucoate, titanium lactate, titanium lactate ethyl ester, titanium triethanolaminate, mild hydrolyzates of the aforementioned and combinations thereof.

6. A method of adhering a thermosetting silicone rubber to a surface presented by a substrate comprising the steps of:

(I) coating said surface with the primer composition of claim 1;

(II) exposing said coated surface to air until said primer composition dries;

(III) applying a thermosetting silicone rubber over said coated surface; and (IV) heating said thermosetting silicone rubber to cause the same to cure.

7. A method in accordance with claim 6 wherein said substrate is a metal.

8. A method in accordance with claim 6 wherein said metal is selected from the group consisting of iron, stainless steel, aluminum, nickel, zinc and copper.

9. A method in accordance with claim 6, wherein said substrate is fabricated from a material selected from the group consisting of acryl resin, phenol resin, epoxy resin, polycarbonate resin, polybutylene terephthalate resin, alkali-treated fluorine resin films, glass, and ceramics.

10. The composition of claim 1, wherein the silicone solvent is selected from the group consisting of hexamethylcyclotrisiloxane, octamethylcyclotetrasiloxane, and decamethylcyclopentasiloxane.

11. The composition of claim 1, wherein component (A) is 100 parts by weight of allyltrimethoxysilane, component (B) is 0.1 to 100 parts by weight of the platinum compound, component (C) is tetra(n-butyl) titanate, and component (D) is n-heptane.

12. The composition of claim 1, wherein component (A) is 100 parts by weight of hexenyltrimethoxysilane, component (B) is 0.1 to 100 parts by weight of the platinum compound, component (C) is tetra(n-butyl) titanate, and component (D) is n-heptane.

* * * * *